US 9,146,923 B2

(12) United States Patent
Kim et al.

(10) Patent No.: US 9,146,923 B2
(45) Date of Patent: Sep. 29, 2015

(54) METHOD AND APPARATUS FOR PROVIDING INFORMATION ABOUT AN IDENTIFIED OBJECT

(75) Inventors: Duck-hoon Kim, Seoul (KR); Hee-seon Park, Seoul (KR); Yoon-hee Choi, Gyeonggi-do (KR); Seok-hyun Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/205,912

(22) Filed: Aug. 9, 2011

(65) Prior Publication Data

US 2012/0041973 A1 Feb. 16, 2012

(30) Foreign Application Priority Data

Aug. 10, 2010 (KR) .................. 10-2010-0076970

(51) Int. Cl.
*G06F 17/30* (2006.01)

(52) U.S. Cl.
CPC ...... *G06F 17/30017* (2013.01); *G06F 17/3002* (2013.01); *G06F 17/30038* (2013.01); *G06F 17/30047* (2013.01)
USPC ........... 707/758; 707/756; 707/804; 707/805; 707/658; 707/769; 707/765; 709/203; 706/46; 706/12; 706/52; 715/736; 345/660; 345/666

(58) Field of Classification Search
CPC .......... G06F 17/30017; G06F 17/3002; G06F 17/30038; G06F 17/30047
USPC ......... 707/658, 769, 765, 758, 756, 804, 805; 706/46, 12, 52; 709/203; 715/736; 345/600, 666
See application file for complete search history.

(56) References Cited

U.S. PATENT DOCUMENTS

| | | | | |
|---|---|---|---|---|
| 5,467,450 A | * | 11/1995 | Coelho ......................... | 715/807 |
| 5,737,507 A | * | 4/1998 | Smith .......................... | 345/666 |
| 6,069,606 A | * | 5/2000 | Sciammarella et al. ...... | 345/660 |
| 6,570,582 B1 | * | 5/2003 | Sciammarella et al. ...... | 345/660 |
| 7,107,535 B2 | * | 9/2006 | Cohen et al. .................. | 715/736 |
| 7,168,048 B1 | * | 1/2007 | Goossen et al. .............. | 715/797 |
| 7,526,464 B2 | * | 4/2009 | Flinn et al. ..................... | 706/52 |
| 7,606,772 B2 | * | 10/2009 | Flinn et al. ..................... | 706/12 |
| 7,817,858 B2 | * | 10/2010 | Rainisto ....................... | 382/187 |
| 8,108,417 B2 | * | 1/2012 | Franks et al. ................. | 707/765 |
| 2002/0032723 A1 | * | 3/2002 | Johnson et al. .............. | 709/203 |
| 2003/0131007 A1 | * | 7/2003 | Schirmer et al. ............. | 707/100 |
| 2005/0076053 A1 | | 4/2005 | Katayama et al. | |
| 2005/0181777 A1 | * | 8/2005 | Kim .............................. | 455/418 |

(Continued)

FOREIGN PATENT DOCUMENTS

| | | | |
|---|---|---|---|
| EP | 0860785 A1 | * | 2/1988 |
| JP | 2009-509363 | | 3/2009 |

(Continued)

*Primary Examiner* — Frantz Coby
(74) *Attorney, Agent, or Firm* — The Farrell Law Firm, P.C.

(57) ABSTRACT

A method and apparatus for identifying an object from an image or context aware information and providing information about the identified object. The method includes identifying at least one object included in an image being displayed or to be displayed on a user device, obtaining relationship information of an identified object based on identification information of the identified object, and outputting the relationship information to at least one of the user device and a device of the identified object.

43 Claims, 8 Drawing Sheets

(56) References Cited

U.S. PATENT DOCUMENTS

| | | | |
|---|---|---|---|
| 2006/0038833 A1 | 2/2006 | Mallinson et al. | |
| 2006/0174216 A1* | 8/2006 | Peterson et al. | 715/853 |
| 2006/0200432 A1* | 9/2006 | Flinn et al. | 706/12 |
| 2006/0200434 A1* | 9/2006 | Flinn et al. | 706/12 |
| 2006/0200435 A1* | 9/2006 | Flinn et al. | 706/12 |
| 2006/0265670 A1* | 11/2006 | Cohen et al. | 715/854 |
| 2007/0011186 A1* | 1/2007 | Horner et al. | 707/102 |
| 2007/0124296 A1* | 5/2007 | Toebes | 707/5 |
| 2007/0156614 A1* | 7/2007 | Flinn et al. | 706/12 |
| 2007/0171046 A1* | 7/2007 | Diem | 340/539.13 |
| 2008/0005686 A1* | 1/2008 | Singh | 715/764 |
| 2008/0101701 A1* | 5/2008 | Rainisto | 382/187 |
| 2008/0172857 A1 | 7/2008 | Brinkworth et al. | |
| 2008/0175519 A1 | 7/2008 | Nagumo | |
| 2008/0194270 A1 | 8/2008 | Greenberg | |
| 2008/0250039 A1 | 10/2008 | Franks et al. | |
| 2008/0285689 A1 | 11/2008 | Demir | |
| 2009/0037848 A1* | 2/2009 | Tewari et al. | 715/835 |
| 2009/0117883 A1 | 5/2009 | Coffing et al. | |
| 2009/0241039 A1 | 9/2009 | Estevez et al. | |
| 2009/0300122 A1 | 12/2009 | Freer | |
| 2009/0319929 A1* | 12/2009 | Wang et al. | 715/765 |
| 2009/0322671 A1 | 12/2009 | Scott et al. | |
| 2010/0009713 A1 | 1/2010 | Freer | |
| 2010/0017722 A1 | 1/2010 | Cohen | |
| 2010/0023879 A1* | 1/2010 | Finn et al. | 715/757 |
| 2010/0141742 A1* | 6/2010 | Luber | 348/51 |
| 2010/0177116 A1* | 7/2010 | Dahllof et al. | 345/619 |
| 2010/0184451 A1 | 7/2010 | Wang et al. | |
| 2011/0010324 A1* | 1/2011 | Bolivar et al. | 706/46 |
| 2012/0041973 A1* | 2/2012 | Kim et al. | 707/769 |
| 2012/0059787 A1* | 3/2012 | Brown et al. | 706/52 |
| 2012/0124495 A1* | 5/2012 | Amichai et al. | 715/762 |
| 2012/0311501 A1* | 12/2012 | Nonez et al. | 715/838 |
| 2014/0236879 A1* | 8/2014 | Bolivar et al. | 706/46 |

FOREIGN PATENT DOCUMENTS

| | | | |
|---|---|---|---|
| KR | 1020080101063 | 11/2008 | |
| KR | 1020090001367 | 1/2009 | |
| KR | 1020090073294 | 7/2009 | |
| KR | 1020090120176 | 11/2009 | |
| KR | 10-0936198 | 1/2010 | |
| KR | 1020100045312 | 5/2010 | |
| KR | 1020100076970 | 7/2010 | |
| WO | WO 2006109459 A1 * | 10/2006 | G06F 17/30 |
| WO | WO 2007/005118 | 1/2007 | |
| WO | WO 2008/097052 | 8/2008 | |

\* cited by examiner (301)

(302)

(303)

METHOD AND APPARATUS FOR PROVIDING INFORMATION ABOUT AN IDENTIFIED OBJECT

PRIORITY

This application claims priority under 35 U.S.C. §119(a) to Korean Patent Application No. 10-2010-0076970, which was filed in the Korean Intellectual Property Office on Aug. 10, 2010, the entire disclosure of which is incorporated herein by reference.

BACKGROUND OF THE INVENTION

1. Field of the Invention

The present invention relates generally to a method and apparatus for providing information about an object, and more particularly to a method and apparatus for identifying an object from an image or context aware information and providing information about the identified object.

2. Description of the Related Art

With the development of communications technology, communication between persons and relationship-based activities has increased. In particular, as online activities using social network websites such as Facebook®, Cyworld®, Twitter®, etc. increase, a variety of applications that provide information using a user device have been widely suggested.

SUMMARY OF THE INVENTION

Accordingly, an aspect of the present invention is to provide a method for providing and apparatus for identifying an object from an image or context aware information and providing information about the identified object.

Another aspect of the present invention is to provide a method and apparatus for providing recommendation information based on relationship information between objects or between an object and a user.

Another aspect of the present invention is to provide a method and apparatus for providing relationship information between objects or between an object and a user that is included in an image being displayed on a user device.

Another aspect of the present invention is to provide a method and apparatus for providing recommendation information based on relationship information between objects or between an object and a user that is included in an image being displayed on a user device.

Another aspect of the present invention is to provide a method and apparatus for providing relationship information between objects or between an object and a user based on the context of a user device.

Another aspect of the present invention is to provide a method and apparatus for providing recommendation information based on relationship information between objects or between an object and a user based on the context of a user device.

According to an aspect of the present invention, a method of providing information includes identifying an object included in an image being displayed or to be displayed on a user device, obtaining relationship information of the object based on identification information of the object, and outputting the relationship information to at least one of the user device and a device of the object.

According to another aspect of the present invention, a method of providing information includes identifying an object from context aware information based on a user device, acquiring relationship information of the object based on identification information of the object, and outputting the relationship information to at least one of the user device and a device of the object.

According to another aspect of the present invention, a user device includes an output unit for displaying an image, and a processor for identifying an object included in the image being displayed or to be displayed on the output unit, obtaining relationship information of the object based on identification information of the object, and outputting the relationship information to at least one of the output unit and a device of the object.

According to another aspect of the present invention, a user device includes a context aware information collection unit, and a processor for identifying an object from information collected by the context aware information collection unit and obtaining relationship information of the object based on identification information of the object.

BRIEF DESCRIPTION OF THE DRAWINGS

The above and other aspects, features, and advantages of certain embodiments of the present invention will become more apparent from the following detailed description taken in conjunction with the accompanying drawings, in which.

DETAILED DESCRIPTION OF EMBODIMENTS OF THE INVENTION

Various embodiments of the present invention will be described in detail hereinafter with reference to the accompanying drawings. This present invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
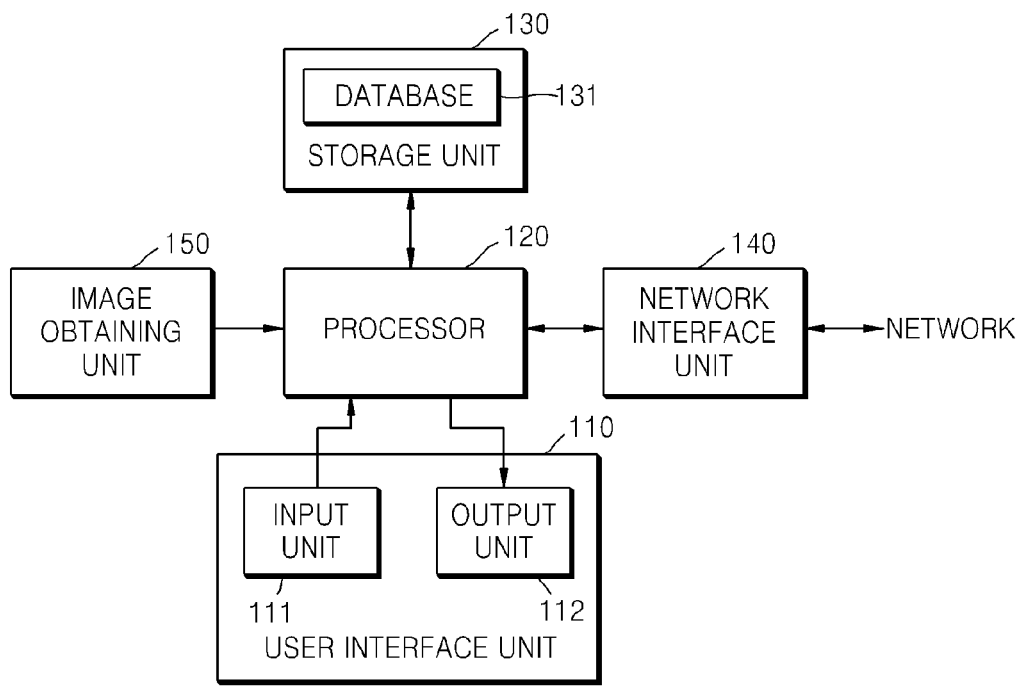
FIG. 1 is a block diagram illustrating a user device according to an embodiment of the present invention.

FIG. 1 is a block diagram illustrating a user device according to an embodiment of the present invention.

Specifically, the user device provides information between objects included in an image being displayed on the user device or between an object and a user included in an image being displayed. Additionally, the image may be an image to be displayed on the user device.

The user device illustrated in FIG. 1 is connectable to a wired/wireless network and for example, may be a mobile device such as a mobile phone, an MP3 player, a navigation device, a Personal Digital Assistants (PDA), etc.

Referring to FIG. 1, the user device includes a user interface unit 110, a processor 120, a storage unit 130, a network interface unit 140, and an image obtaining unit 150.

The user interface unit 110 interfaces between the user device and a user of the user device, using an input unit 111 and an output unit 112. For example, the user interface unit 110 may input an input signal such as a touch-based signal, a key-based signal, and a mouse operation-based signal, and may output an image and other information.

A signal input through the user interface unit 110 may be interpreted as a signal input through the input unit 111. A signal output through the user interface unit 110 may be interpreted as a signal output through the output unit 112. For example, the output unit 112 may be a display device such as a Liquid Crystal Display (LCD), a Light-Emitting Diode (LED) display, an Active-Matrix Organic Light-Emitting Diode (AMOLED) display, etc.

An image is displayed by the user interface unit 110. The image may be read from the storage unit 130, received from outside the user device, e.g., received through the network unit 140, or obtained by the image obtaining unit 150. Usually, an object, e.g., a person, an animal, a tree, etc., is included in an image being displayed on the user device.

The information about an object that is provided according to an embodiment of the present invention may include relationship information and recommendation information. The relationship information may link or correlate an object included in an image and a user of the user device or link or correlate objects included in an image. When an image includes a plurality of objects, the relationship information may indicate link or correlation between multiple objects included in the image and the user.

For example, when an object is a person, the relationship information may be defined as personal connections between the person included in an image and the user or between people included in an image, a birthday of a person, an interest of a person, a common interest between a person and the user or between people in the image, etc. The common interest between the a person and the user or between people in the image may be defined as, for example, a music lovers group, a noodle lovers group, a swimming group, etc.

As another example, when an image includes an object such as a ball, an animal, ball+person, ball+animal, or animal+person, the relationship information may be defined as information indicating link or correlation between the object and the user or information indicating link or correlation between objects. For example, when the object is a user's house, the relationship information may be defined as "our house". For example, when the image includes two objects, i.e., person A and a house, and person A owns the house, the relationship information may be defined as "A's house".

Recommendation information is based on relationship information. For example, when the relationship information is "friend", the recommendation information may be particular place information or guide information to a particular shopping mall, based on a particular activity between the object and the user. For example, when the relationship information is "our house", the recommendation information may be guide information to a shop that was recently visited by the user from our house.

That is, the recommendation information is information that is obtainable based on various types of relationship information such as information obtained based on interest between an object and a user or between objects, information obtained based on a link and correlation between an object and a user or between objects, information obtained based on a common interest of a group between an object and a user or between objects, or information obtained based on interests and schedules between an object and a user or between objects. Further, the recommendation information may be defined as guide information based on the relationship information.

Referring back to FIG. 1, the processor 120 controls functions of the user device. For example, the processor 120 may be a controller, a microprocessor, etc. The processor 120 identifies at least one object included in an image being displayed on the output unit 112, and obtains relationship information between objects identified, based on identification information of an object or between an object that is identified and a user of the user device.

The processor 120 outputs the obtained relationship information to the output unit 112, or transmits the obtained relationship information to the output unit 112 while simultaneously outputting the obtained relationship information to a device (not shown) that an object, e.g., a person, has through the network device 140. That is, if the object is a person, the device of the object may be a mobile device of the person or a smart phone of the person. If the object is a building or a company or a museum, the device of the object may be a communication device registered to the building or the company or the museum, wherein the communication device can receive information. If the object is an animal or a tree, the device of the object does not exist. Information about the device of the object may be obtained when an object is identified.

The processor 120 may load a program for performing the information providing method that is stored in the storage unit 130. The program may be stored in the storage unit 130 during the manufacture of the user device or by downloading the program from a server (not shown) through the network interface unit 140. For example, the server may an Application Store server.

Figure 2:
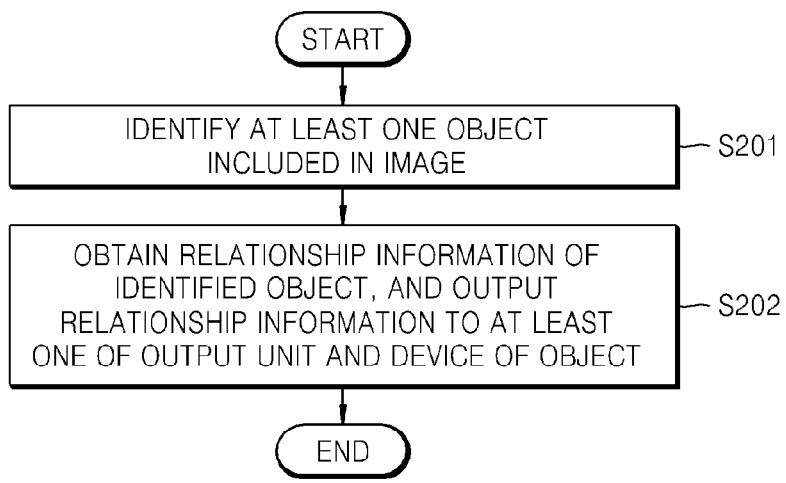
FIG. 2 is a flowchart illustrating a method for providing information in a user device according to an embodiment of the present invention.

FIG. 2 is a flowchart illustrating a method for providing information in a user device according to an embodiment of the present invention. Specifically, FIG. 2 will be described below with reference to the user device illustrated in FIG. 1.

Referring to FIG. 2, the processor 120 identifies at least one object included in an image being displayed on the output unit 112 in step S201. For example, the object included in the image may be identified by finding a matching image by searching a database 131 stored in the storage unit 130 in units of images to be displayed on the output unit 112 or searching an external database (not shown) connected through the network interface unit 140.

The external database may be managed by a database management server (not shown) or a social network server connected through a network, or stored in an external storage medium (not shown) connected through a wired network. The external storage medium may be storage media such as a hard disk drive. The external database or the database 131 stored in the storage unit 130 may include data according to a result of analysis of data collected from the social network server. The data collected from the social network server may include information about an object and user information of the user device.

The processor 120 may identify the object included in an image by extracting the object included in the image from a background and searching the database 131 stored in the storage unit 130 or the external database, in units of extracted objects. For example, when the extracted object is a person, the extraction may include extracting a face image from the image.

Further, when an image includes a plurality of objects and a signal for selecting any one object is received from the input unit 111 of the user interface unit 110, the processor 120 may extract an object selected from an image being displayed and search the above-described database based on the extracted object, thereby identifying the selected object.

The processor 120 may obtain identification information of the object included in an image by conducting a search in units of the above-described images or objects. For example, the identification information of an object may be presented as information such as a name of an object, a keyword, an ID, a nickname, etc.

In step S202, the processor 120 obtains relationship information of an identified object based on identification information of the object. The relationship information obtained in operation S202 may be relationship information between objects included in an image or relationship information between at least one object included in the image and a user of the user device.

The relationship information may be obtained by searching the database 131 or the above-described external database using the identification information of an object. Thus, the database 131 stored in the storage unit 130 or the above-described external database may include the identification information of an object and relationship information based on the identification information and the user information.

Additionally, in step S202, the processor 120 outputs the obtained relationship information to at least one of the output unit 112 and the device of an object, or transmits the obtained relationship information to the device of an object through the network device 140, while simultaneously outputting the obtained relationship information to the output unit 112.

Figure 3:
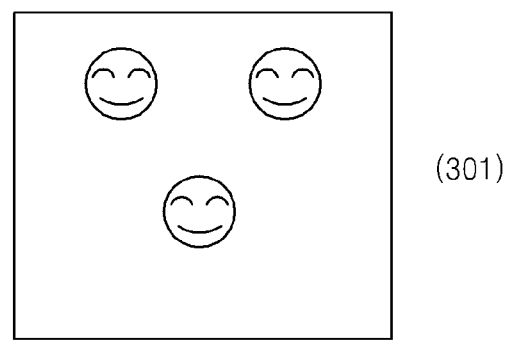
FIG. 3 illustrates screen images when providing information in a user device according to an embodiment of the present invention.
Figure 3:
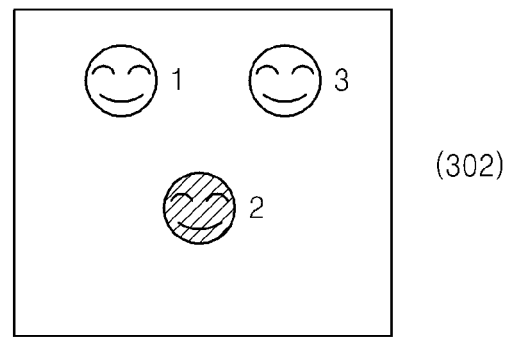
Figure 3:
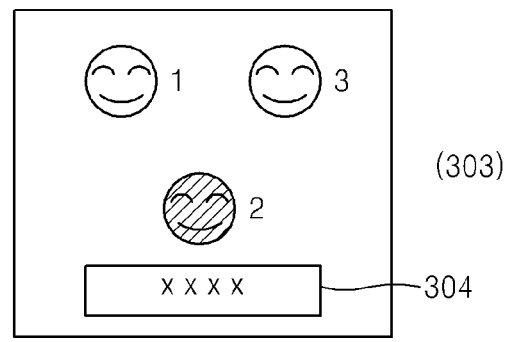

FIG. 3 illustrates screen images when providing information in a user device according to an embodiment of the present invention.

Referring to FIG. 3, three people are included in a displayed image displayed. In a screen 301, the processor 120 searches the database 131 in units of objects and obtains identification information 1, 2, and 3 for each person, respectively, as illustrated in screen 302. The identification information for each object may be displayed as illustrated in screen 302, or the identification information may not be displayed. Although the identification information for each object is displayed using numbers, for convenience of explanation, the identification information for each object may be defined as information such as a name, a nickname, or an ID of an object.

When a signal for selecting an object corresponding to identification information 2 is received, after identification information of each object is obtained, the processor 120 may obtain relationship information between object 2 and a user of the user device by searching the database 131 or/and the external database. As illustrated in screen 303, the obtained relationship information may be displayed in a separate area 304.

For example, the relationship information displayed in area 304 may be relationship information between at least two of objects 1, 2, and 3, or relationship information between at least two of objects 1, 2, and 3 and a user of the user device.

Figure 4:
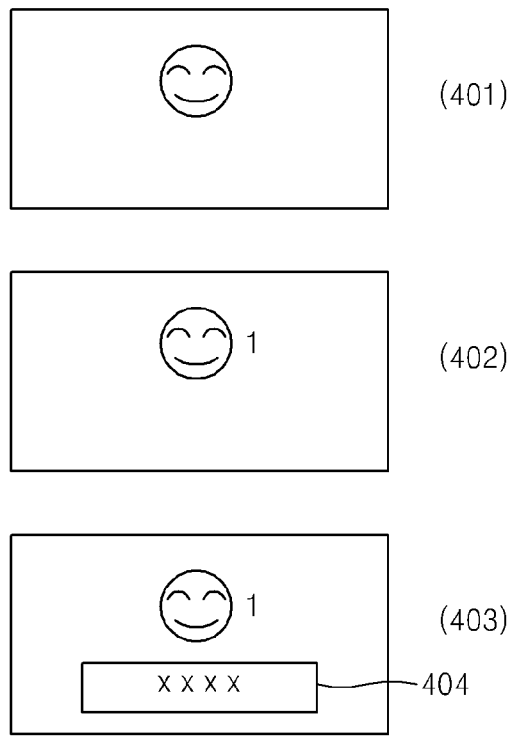
FIG. 4 illustrates screen images when providing information in a user device according to an embodiment of the present invention.

FIG. 4 illustrates screen images when providing information in a user device according to an embodiment of the present invention.

Referring to FIG. 4, a displayed image includes one object in screen 401. When identification information of the object is 1, as illustrated in screen 402, relationship information obtained based on the identification information 1 of the object is displayed in a separate area 404, in screen 403. The relationship information displayed in the area 404 is relationship information between the object having identification information 1 and a user of the user device.

A device of an object receiving the obtained relationship information through a network may display the same image as screen 303 or 403. If an object is a person and the device of the object is a mobile device of that person, the relationship information is also sent to the mobile device of that person.

Figure 5:
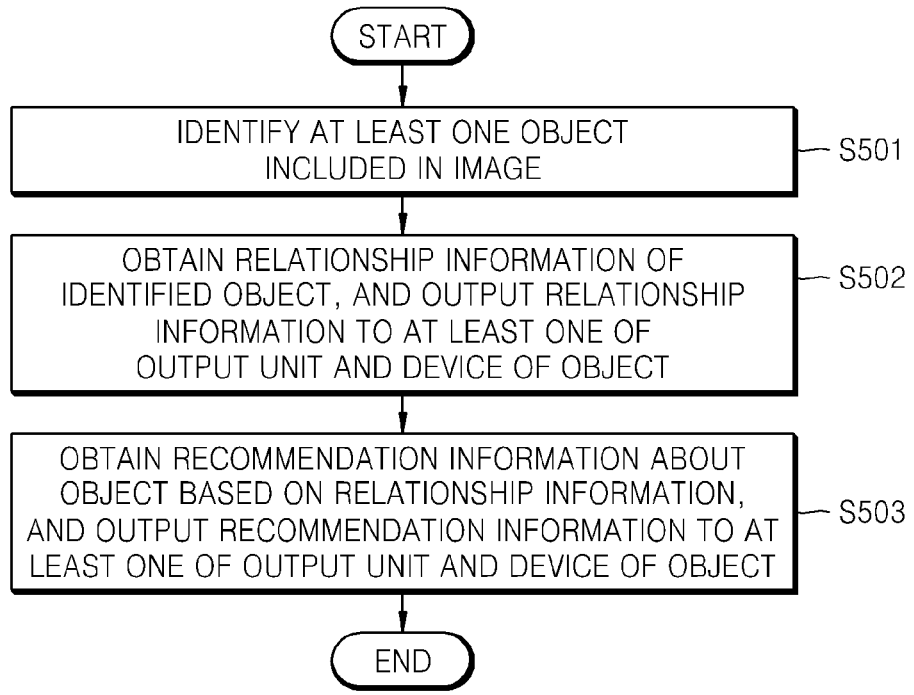
FIG. 5 is a flowchart illustrating a method for providing information in a user device according to an embodiment of the present invention.

FIG. 5 is a flowchart illustrating a method for providing information in a user device according to an embodiment of the present invention. Accordingly, because steps S501 and S502 of FIG. 5 are the same as steps S201 and S202 of FIG. 2, respectively, to avoid repetitive descriptions, the descriptions of steps S501 and S502 are omitted herein.

Compared to the method illustrated in FIG. 2, the method illustrated in FIG. 5 further includes obtaining recommendation information, and outputting the obtained recommendation information or transmitting the obtained recommendation information to a device of an object while simultaneously outputting the obtained recommendation information.

Specifically, in step S503, the processor 120 obtains recommendation information about an object based on relationship information. The recommendation information may be obtained by searching the database 131 or/and the above-described external database using the relationship information. For example, when the relationship information obtained in step S502 is at least one of personal connections information, correlation information, and interest information, information inferred through the searching of the database 131 or/and the external database based on the at least one of personal connections information, correlation information, and interest information is obtained as recommendation information. The obtained recommendation information may be output to the output unit 112 or transmitted to the device of an object through the network interface unit 140 while being output to the output unit 112. The recommendation information output to the output unit 112 and the device that an object has may be displayed on a corresponding image, as illustrated in screen 303 of FIG. 3 or screen 403 of FIG. 4.

However, when the recommendation information is displayed together with the relationship information, the processor 120 displays the recommendation information and the relationship information in separate areas that do not overlap with each other. Although the recommendation information or an image to be displayed with the recommendation information may be transmitted to the device of an object, the relationship information is also transmitted to the device of the object so that an image including the same information as that displayed in the user device may be displayed on the device of the object. For example, the transmission to the device of an object may be performed using a Multimedia Message Service (MMS) method.

When there is more than one piece of recommendation information obtained in step S503, the processor 120 detects a keyword from each piece of recommendation information and outputs the detected keyword. The keyword, which is a word representing the recommendation information, may be defined by at least one of the words included in the recommendation information or determined based on the content of the recommendation information. The keyword detected from the recommendation information is information different from a keyword of an object. Thus, when the identification information of an object is defined by a keyword, a keyword for identification information of an object may be defined as a first keyword and a keyword for recommendation information may be defined as a second keyword.

For example, if recommendation information is related to a restaurant, a keyword may be determined as a "top restaurant" based on the content of recommendation information or defined as a "restaurant" based on words included in the recommendation information. If recommendation information is related to playing, a keyword may be determined as "activity" based on the content of recommendation information or defined as "swimming" based on words included in the recommendation information. If recommendation information is related to a celebration, a keyword may be determined as an "anniversary" based on the content of recommendation information or defined as a "birthday" based on words included in the recommendation information.

When a selection signal based on the keyword is received, the processor 120 may output recommendation information corresponding to a selected keyword according to the selection signal, or transmit the recommendation information corresponding to the selected keyword to the device of an object while simultaneously outputting the recommendation information to the user device.

Although the selected keyword may be transmitted during the transmission of a keyword, finally output image information may be transmitted by the MMS method in order to have the same image as an image finally output to the output unit 112 output to the device of an object, as described above.

The keyword and the recommendation information may be displayed in separate areas, when output to user device. When the keyword and the recommendation information are separately displayed, the recommendation information may be defined as keyword-based detailed information.

When there are multiple objects in an image, the recommendation information obtained in step S503 may be transmitted to all devices of the objects. However, a device to which the obtained recommendation information is transmitted may be chosen according to a user's selection. Also, when there are multiple objects in an image, the recommendation information and the relationship information may be defined as the recommendation information and the relationship information of a group.

Figure 6:
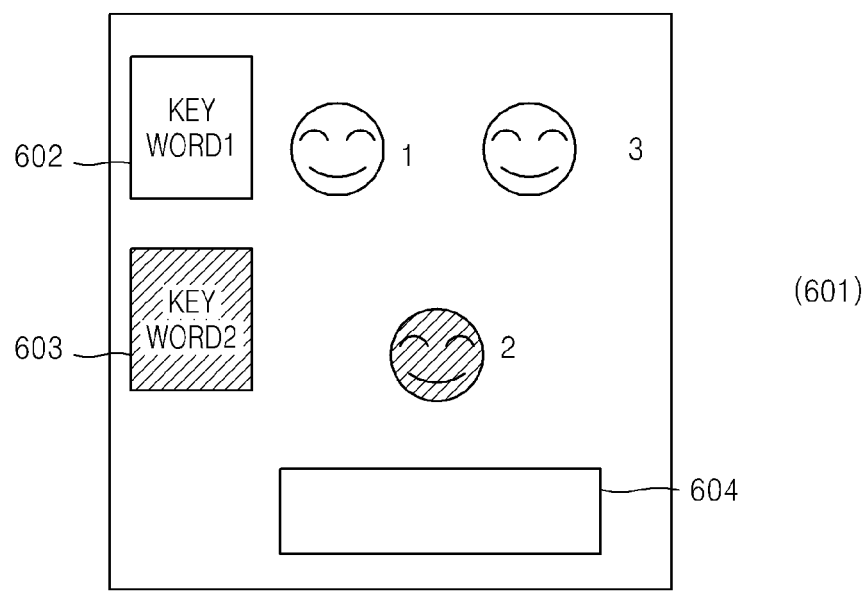
FIG. 6 illustrates screen images when displaying a keyword for recommendation information and recommendation information according to an embodiment of the present invention.
Figure 6:
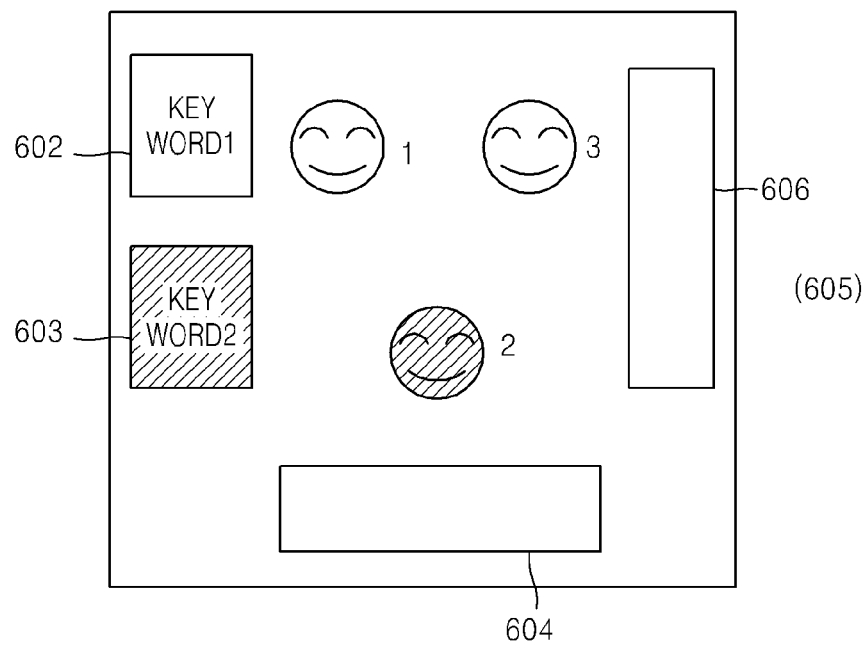

FIG. 6 illustrates screen images when displaying a keyword for recommendation information and recommendation information according to an embodiment of the present invention.

Referring to FIG. 6, when image 601, which includes a plurality of recommendation information keywords 602 and 603, is displayed on a user device and a signal selecting the keyword 603 is received, the processor 120 outputs screen 605, in which recommendation information corresponding to the keyword 603 is displayed in area 606. Area 604, where the relationship information obtained in operation S502 is displayed, corresponds to area 304 of FIG. 3.

Obviously, the positioning of area 604 and area 606 may vary.

Although, in FIG. 6, the selected keyword is highlighted or displayed in a different color from an unselected keyword, the selected keyword and the unselected keyword may be displayed in the same manner. When screen 605 is a final screen output, in step S503, the processor 120 may transmit information about the display of screen 605 to the device of an object.

Referring again to FIG. 1, the network interface unit 140 is configured to transmit and receive data with at least one server (not shown) or at least one device of an object (not shown) through a wired or wireless network. Further, the image obtaining unit 150 may include a camera. Additionally, the storage unit 130 may be a flash memory and may store the above-described program, data, and database for operation of the user device.

Figure 7:
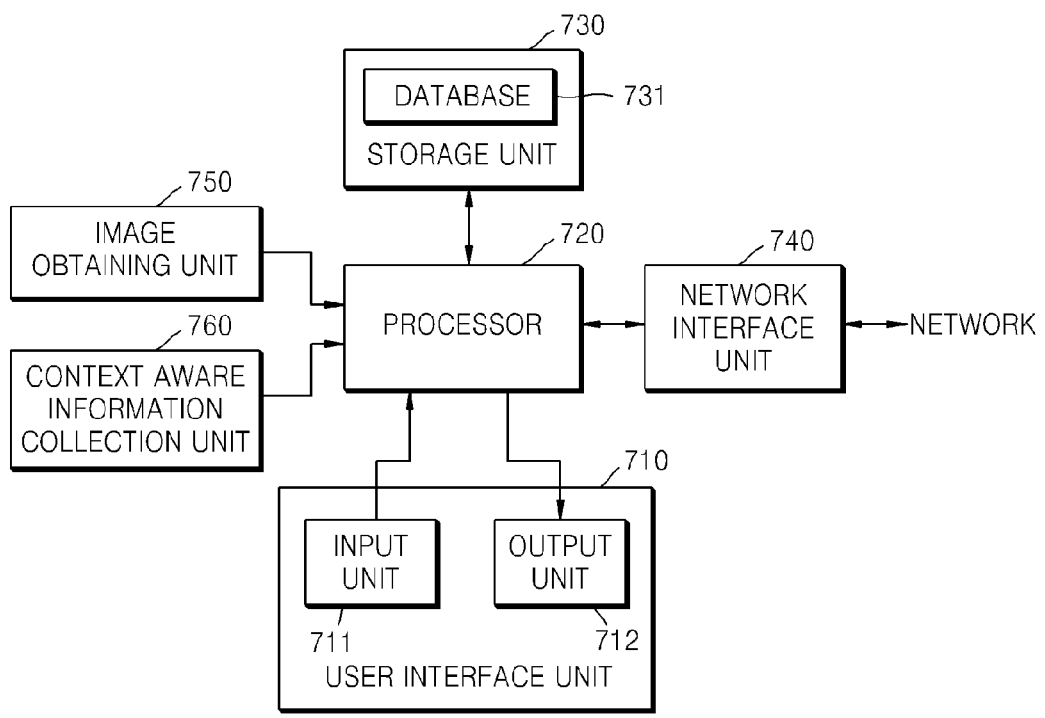
FIG. 7 is a block diagram illustrating a user device according to an embodiment of the present invention.

FIG. 7 is a block diagram illustrating a user device according to an embodiment of the present invention. Specifically, the user device of FIG. 7 is similar to that illustrated in FIG. 1, but additionally uses context aware information of the user device. The context aware information is information about awareness of a situation around the user device, e.g., information about current time and current location (current place).

Accordingly, a user interface unit 710, a storage unit 730 storing a database 731, a network interface unit 740, and an image obtaining unit 750 included in the user device of FIG. 7 are configured and operated in the same as the user interface unit 110, the storage unit 130 storing the database 131, the network interface unit 140, and the image obtaining unit 150 included in the user device 100 illustrated in FIG. 1. Accordingly, a repetitive description of the user interface unit 710, the storage unit 730 storing the database 731, the network interface unit 740, and the image obtaining unit 750 will be omitted herein.

Referring to FIG. 7, a context aware information collection unit 760 collects information about awareness of a situation in a predetermined area based on the user device. The collected information may include information about current time and current location (current place). To this end, the context aware information collection unit 760 may include a Global Positioning System (GPS) or a base station based positioning system.

The processor 720 identifies an object included in an image being displayed, similar to processor 120 of FIG. 1. However, when obtaining relationship information between the identified objects or between the identified object and a user of the user device, the processor 720 may use information collected by the context aware information collection unit 760. That is, the relationship information may be obtained by searching a database 731 or/and an external database (not shown) based on the identification information of identified objects and context aware information, or the identification information of an identified object, identification information of a user, and context aware information.

Figure 8:
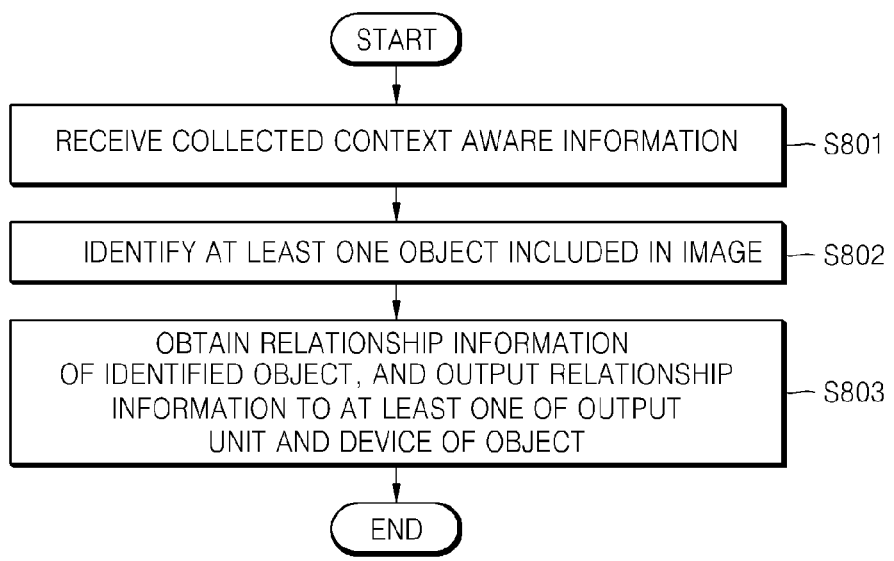
FIG. 8 is a flowchart illustrating a method for providing information in a user device according to an embodiment of the present invention.

FIG. 8 is a flowchart illustrating a method for providing information in a user device according to an embodiment of the present invention. Specifically, FIG. 8 will be described below with reference to the user device illustrated in FIG. 7.

Referring to FIG. 8, the processor 720 receives context aware information collected by the context aware information collection unit 760. The collected context aware information may include current time and current location information as described above.

The processor 720 identifies at least one object included in an image being displayed on the output unit 712 in step S802.

For example, the object included in an image may be identified using information of the above-described database 731 or/and external databases.

In step S803, the processor 720 obtains relationship information of the identified object based on the received context aware information and the identification information of the object. When the received context aware information is the current time and current location information, as described above, the time information and current location information may be used in obtaining relationship information between objects included in an image or between an object included in an image and a user. The obtained relationship information may be output to at least one of the output unit 712 and the device of the object (not shown), or transmitted to the device of the object through the network interface unit 740, while being simultaneously output to the output unit 712.

Figure 9:
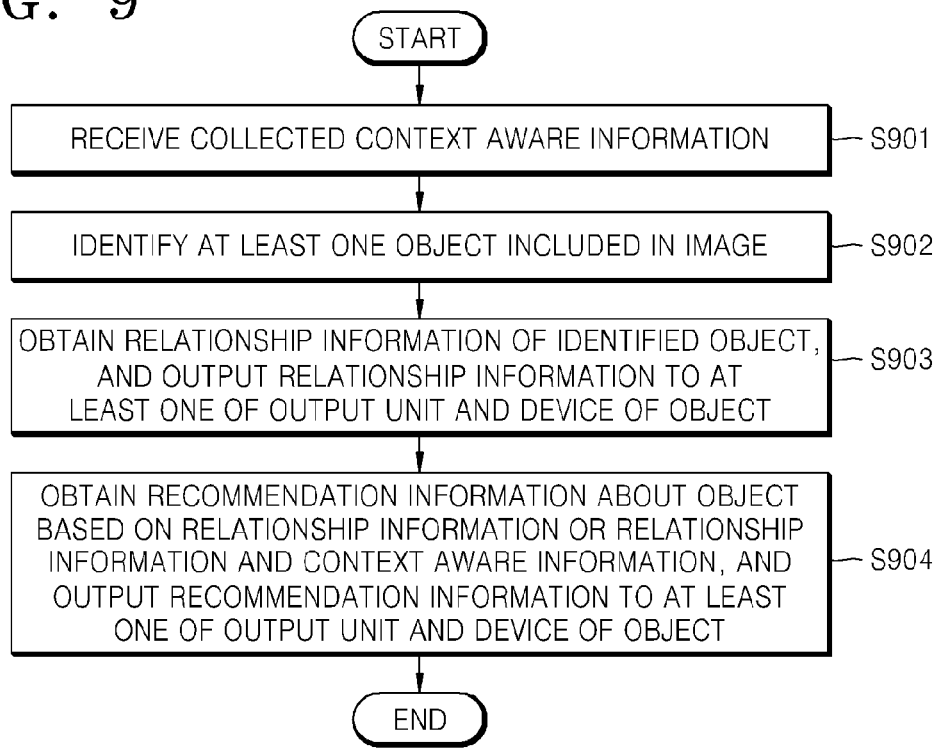
FIG. 9 is a flowchart illustrating a method for providing information in a user device according to an embodiment of the present invention.

FIG. 9 is a flowchart illustrating a method for providing information in a user device according to an embodiment of the present invention. Specifically, FIG. 9 will be described below with reference to the user device illustrated in FIG. 7.

In addition to steps S901, S902, and S903, which correspond to steps S801, S802, and S803 of FIG. 8, the method of FIG. 9 further includes obtaining recommendation information, and outputting the obtained recommendation information to at least one of the output unit 712 and the device of an object or transmitting the obtained recommendation information to the device of the object while simultaneously outputting the obtained recommendation information to the output unit 712.

In step S904, the processor 720 obtains recommendation information about an object based on relationship information. The processor 720 may obtain recommendation information about an object using the context aware information collected by the context aware information collection unit 760 and the relationship information. The processor 720 may output the obtained recommendation information to at least one of the output unit 712 and the device of the object or may transmit the obtained recommendation information to the device of the object, while simultaneously outputting the obtained recommendation information to the output unit 712. The recommendation information may be obtained by searching the database 731 or/and the above-described external database using relationship information.

Figure 10:
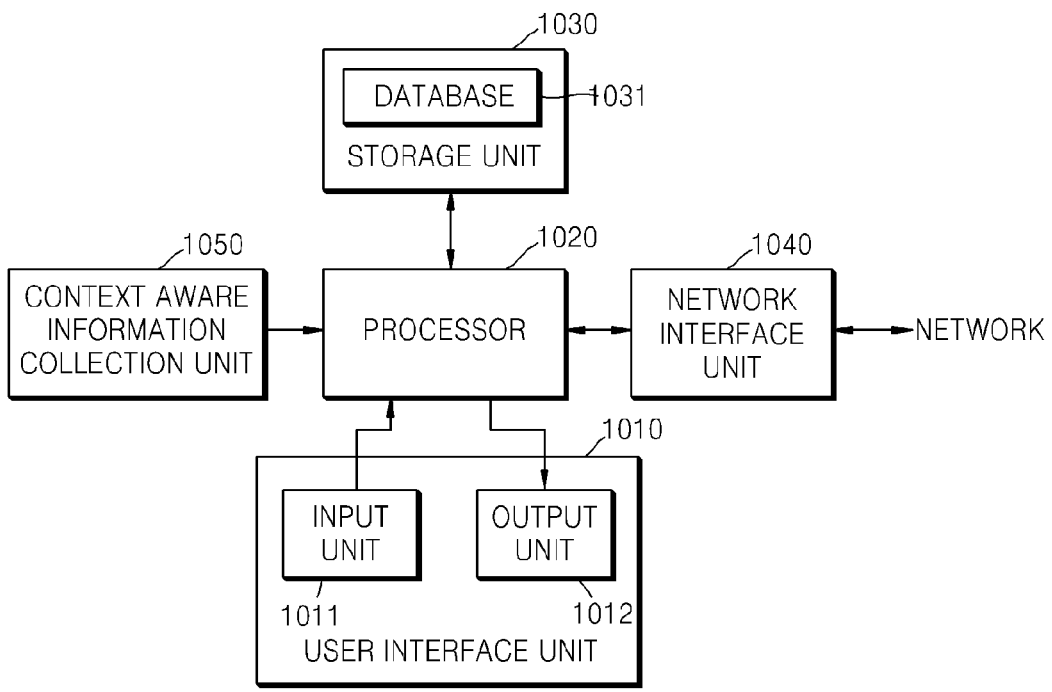
FIG. 10 is a block diagram illustrating a user device according to an embodiment of the present invention.

FIG. 10 is a block diagram illustrating a user device according to an embodiment of the present invention. Specifically, the user device identifies an object based on context aware information of the user device and provides information about the identified object.

Referring to FIG. 10, the user device includes a user interface unit 1010, a processor 1020, a storage unit 1030 for storing a database 1031, a network interface unit 1040, and a context aware information collection unit 1050.

The context aware information collection unit 1050 includes an identification information collection unit (not shown) for collecting identification information of at least one object existing in a predetermined area. Accordingly, the context aware information collection unit 1050 may be defined as an identification information collection unit. The context aware information collection unit 1050 may include a GPS module (not shown) or a base station based location information collection module to collect the current time and current location information. The base station based location information collection module may be referred as the base station based positioning system.

Figure 11:
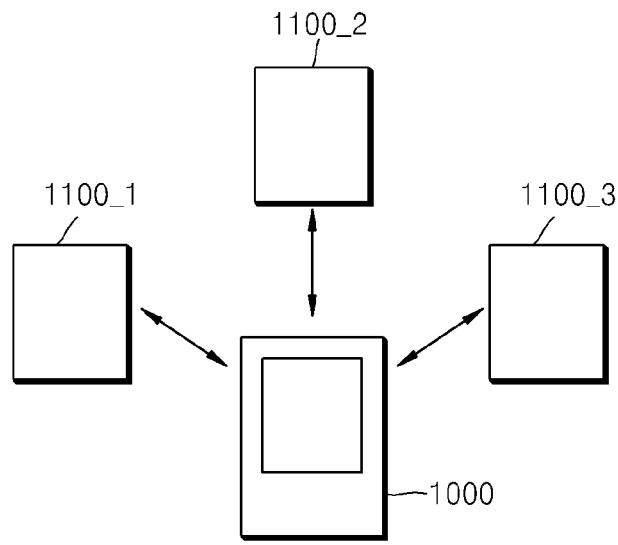
FIG. 11 illustrates an environment for collecting identification information of an object based on a user device, according to an embodiment of the present invention.

FIG. 11 illustrates an environment for collecting identification information of an object according to an embodiment of the present invention.

Referring to FIG. 11, when three mobile devices 1100_1, 1100_2, and 1100_3 are located in an area around a user device 1000, the context aware information collection unit 1050 may receive identification information about a user of each of the three mobile devices 1100_1, 1100_2, and 1100_3 from each of the three mobile devices 1100_1, 1100_2, and 1100_3. Also, the context aware information collection unit 1050 may collect identification information of an object based on the information received by a wire or a sensor.

The processor 1020 may then obtain relationship information by searching the database 1031 or/and an external database based on identification information for each object which is collected by the context aware information collection unit 1050 or the identification information for each object and current time and current location information, and output the obtained relationship information to the output unit 1012 or transmit the obtained relationship information to devices 1100_1 through 1100_3 of objects, while simultaneously outputting the obtained relationship information to the output unit 1012.

Figure 12:
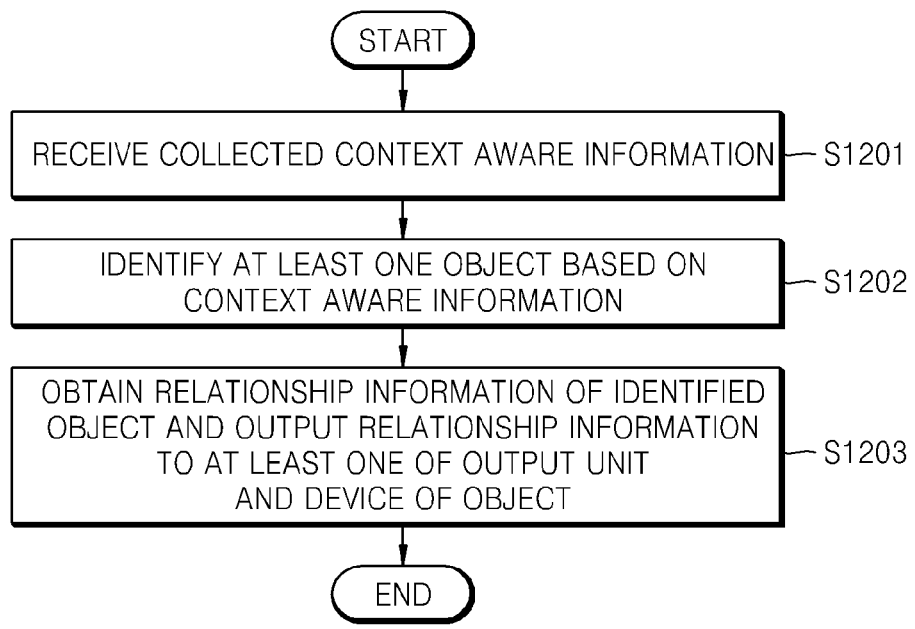
FIG. 12 is a flowchart illustrating a method for providing information in a user device according to an embodiment of the present invention.

FIG. 12 is a flowchart illustrating a method for providing information in a user device, according to an embodiment of the present invention.

Referring to FIG. 12, in step S1201, the processor 1020 receives context aware information collected by the context aware information collection unit 1050. The processor 1020 identifies at least one object based on the received context aware information in step S1202. The object may be one existing in an area around the user device 1000 and may be a person, an object, and an animal.

In step S1203, the processor 1020 obtains relation information of the identified object by searching the database 1031 or/and an external database based on the identification information of an object. The processor 1020 may output the obtained relationship information to at least one of the output unit 1012 and the device 1100_1 through 1100_3 of objects or transmit the obtained relationship information to the devices 1100_1 through 1100_3 of objects, while simultaneously outputting the obtained relationship information to the output unit 1012.

Figure 13:
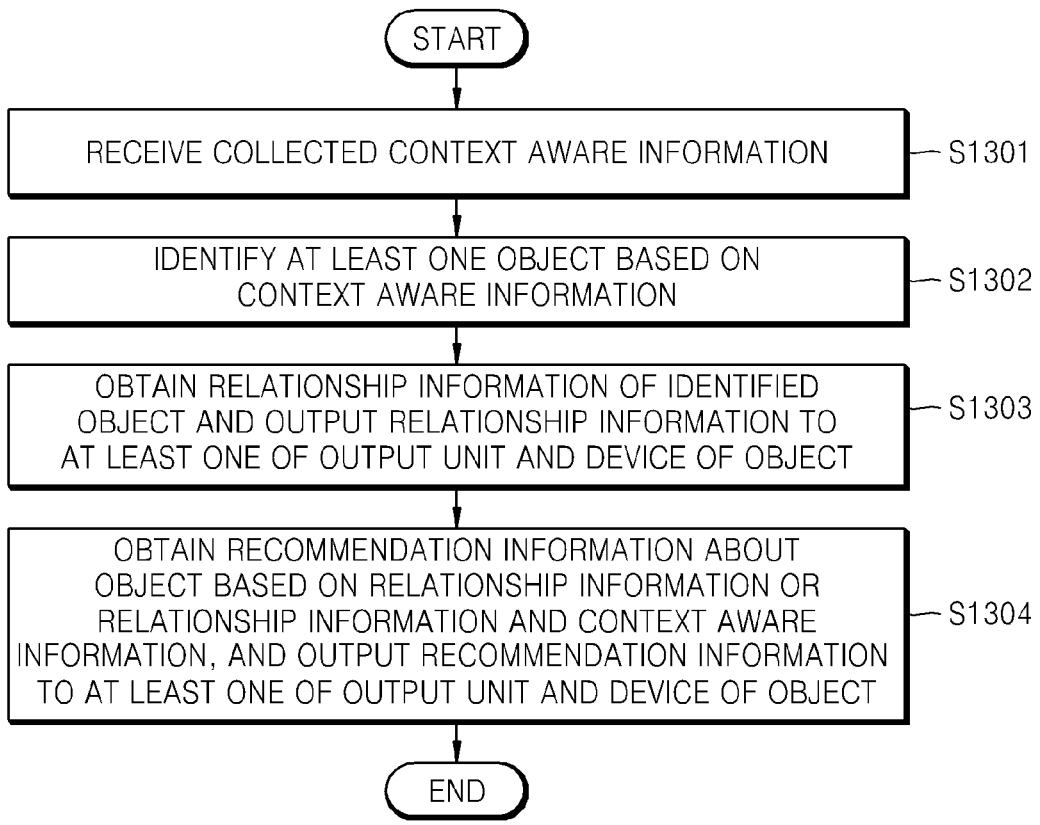
FIG. 13 is a flowchart illustrating a method for providing information in a user device according to an embodiment of the present invention.

FIG. 13 is a flowchart illustrating a method for providing information in a user device according to an embodiment of the present invention.

In addition to steps S1301, S1302, and S1303, which correspond to steps S1201, S1202, and S1203 of FIG. 12, the method of FIG. 13 further includes obtaining recommendation information, and outputting the obtained recommendation information or transmitting the obtained recommendation information to a device of an object (not shown) while simultaneously outputting the obtained recommendation information. Accordingly, because steps S1301, S1302, and S1303 of FIG. 13 are the same as steps S1201, S1202, and S1203 of FIG. 12, respectively, to avoid repetitive descriptions, descriptions steps S1301, S1302, and S1303 are omitted herein.

In step S1304, the processor 1020 may obtain recommendation information about an object based on relationship information or the relationship information and context aware information, and output the obtained recommendation information to the output unit 1012 or to both of the output unit 1012 and the devices 1100_1 through 1100_3 of is objects. The transmission to the devices 1100_1 through 1100_3 of objects is performed using the network interface unit 1040. The recommendation information may be obtained by searching the database 1031 or/and the above-described external database using the relationship information or the relationship information and context aware information.

With reference to FIGS. 10-13, the collection of identification information of an object by the context aware information collection unit 1050 has been described. However, the context aware information collection unit 1050 of FIG. 10 may be modified to collect current time and current location only like the context aware information collection unit 760 of FIG. 7 and collect identification information of an object through the network interface unit 1040.

Figure 14:
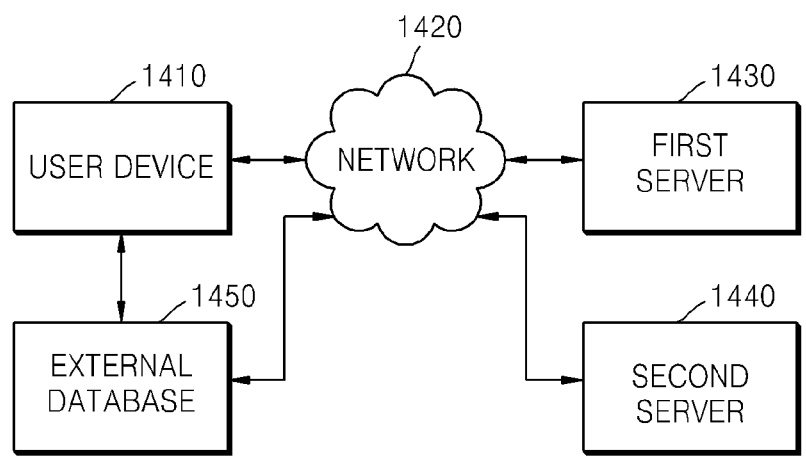
FIG. 14 illustrates a network system including a user device according to an embodiment of the present invention.

The above-described user devices of FIGS. 1, 7, and 10 may be applied to a network system as illustrated in FIG. 14. Specifically, any of the use devices illustrated in FIGS. 1, 7, and 10 may be used as a user device 1410 of FIG. 14.

Referring to FIG. 14, a first server 1430 connected to the user device 1410 through a network 1420 may be a social networking server. A second server 1440 connected to a user device 1410 through the network 1420 may be an application store server that provides the user device 1410 with a program capable of performing the information providing method according to the present invention.

An external database 1450 may store data based on a result of analysis of data collected by the first server 1430 through the network 1420. The external database 1450 may be modified to be connected to the user device 1410 through the network 1420. Thus, the search for information from an external database may be defined as search from a website, i.e., a search for identification information of an object, relationship information, and recommendation information from a website by the user device 1410.

Although the above-described embodiments are described based on an image being displayed on a user device, the above-described embodiments may also be applied to an image to be displayed on the user device.

The above-described embodiments of the present invention can also be embodied as computer-readable codes on a computer-readable recording medium. The computer-readable recording medium is any data storage device that can store data, which can be thereafter read by a computer system. Examples of the computer-readable recording medium include a Read-Only Memory (ROM), a Random-Access Memory (RAM), a Compact Disc (CD)-ROM, a magnetic tape, a floppy disk, an optical data storage device, etc. The computer-readable recording medium can also be distributed over network-coupled computer systems so that the computer-readable code is stored and executed in a distributed fashion.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of providing information in a first device, the method comprising:
   obtaining identification information regarding at least one object included in an image displayed on the first device;
   receiving a user input to select an object from among the at least one object included in the image displayed on the first device;
   obtaining relationship information which represents a relationship between a user of the first device and the selected at least one object based on the identification information of the at least one selected object;
   obtaining recommendation information about the object based on the relationship information;
   outputting the relationship information to at least one of the first device and a second device of the at least one selected object; and
   outputting the recommendation information to at least one of the first device and the second device.

2. The method of claim 1, wherein the relationship information further includes relationship information between objects included in the image.

3. The method of claim 1, wherein obtaining identification information regarding the at least one object comprises searching a database stored in the first device.

4. The method of claim 1, wherein obtaining identification information regarding the at least one object comprises searching an external database of the first device.

5. The method of claim 1, wherein obtaining the relationship information comprises searching a database stored in the first device.

6. The method of claim 1, wherein obtaining the relationship information comprises searching an external database of the first device.

7. The method of claim 1, wherein outputting the relationship information comprises transmitting the relationship information to the second device, while outputting the relationship information to the first device.

8. The method of claim 1, wherein obtaining the recommendation information comprises searching a database stored in the first device.

9. The method of claim 1, wherein obtaining the recommendation information comprises searching an external database of the first device.

10. The method of claim 1, further comprising:
    obtaining context aware information based on the first device; and
    utilizing the context aware information when obtaining the recommendation information.

11. The method of claim 10, wherein the context aware information includes at least one of current time information and current location information relative to the first device.

12. The method of claim 1, further comprising:
    obtaining context aware information based on the first device; and
    utilizing the context aware information when obtaining the relationship information.

13. The method of claim 12, wherein the context aware information includes at least one of current time information and current location information relative to the first device.

14. A non-transitory computer-readable recording medium having recorded thereon a program for executing a method of providing information in a first device, the method comprising:
    obtaining identification information regarding at least one object included in an image displayed on the first device;
    receiving a user input to select an object from among the at least one object included in the image displayed on the first device;
    obtaining relationship information which represents a relationship between a user of the first device and at least one object based on identification information of the at least one object;
    obtaining recommendation information about the object based on the relationship information;
    outputting the relationship information to at least one of the first device and a second device; and
    outputting the recommendation information to at least one of the first device and the second device.

15. A method of providing information in a first device, the method comprising:

identifying at least one object by using context aware information based on the first device;

receiving a user input to select an object from among the at least one object included in the image displayed on the first device;

acquiring relationship information between a user of the first device and the at least one identified object by using identification information of the identified object;

obtaining recommendation information about the at least one object based on the relationship information;

outputting the relationship information to at least one of the first device and a second device of the identified object; and outputting the recommendation information to at least one of the first device and the second device or transmitting the recommendation information to the second device while outputting the recommendation information to the first device.

16. The method of claim 15, wherein the relationship information further includes relationship information between objects in the identifying the at least one object.

17. The method of claim 15, wherein the context aware information includes at least one of identification information of the at least one object around the first device and current time information and current location information relative to the first device.

18. The method of claim 15, wherein obtaining the relationship information comprises searching a database stored in the first device.

19. The method of claim 15, wherein obtaining the relationship information comprises searching an external database of the first device.

20. The method of claim 15, wherein outputting the relationship information comprises transmitting the obtained relationship information to the second device while outputting the obtained relationship information to the first device.

21. The method of claim 15, wherein, in the obtaining of recommendation information, context aware information based on the first device is further used when the recommendation information is obtained.

22. The method of claim 15, wherein obtaining the recommendation information comprises searching a database stored in the first device.

23. The method of claim 15, wherein obtaining the recommendation information comprises searching an external database of the first device.

24. A non-transitory computer-readable recording medium having recorded thereon a program for executing a method of providing information in a first device, the method comprising:

identifying at least one object by using context aware information based on the first device;

receiving a user input to select an object from among the at least one object included in the image displayed on the first device;

acquiring relationship information which represents a relationship between a user of the first device and the at least one object based on identification information of the at least one object;

obtaining recommendation information about the at least one object based on the relationship information;

outputting the relationship information to at least one of the first device and a second device of the at least one object; and outputting the recommendation information to at least one of the first device and the second device or transmitting the recommendation information to the second device while outputting the recommendation information to the first device.

25. A first device comprising:

a display for displaying an image; and a processor for obtaining identification information regarding at least one object included in the image displayed on the display, receiving a user input to select an object from among the at least one object included in the image displayed on the first device, obtaining relationship information which represents a relationship between a user of the first device and the at least one object based on the identification information of the at least one object, obtaining recommendation information about the at least one object based on the relationship information, outputting the relationship information to at least one of the display and a second device of the at least one object, and outputting the recommendation information to at least one of the display and the second device.

26. The first device of claim 25, wherein the relationship information further comprises relationship information between objects included in the image.

27. The first device of claim 25, further comprising a storage unit for storing a database containing the identification information of the at least one object, wherein the processor identifies the object by searching the database.

28. The first device of claim 25, wherein the processor identifies the at least one object by searching an external database of the first device.

29. The first device of claim 25, further comprising a storage unit for storing a database containing information for obtaining the relationship information, wherein the processor obtains the relationship information by searching the database.

30. The first device of claim 25, wherein the processor obtains the relationship information by searching an external database of the first device.

31. The first device of claim 25, wherein the processor transmits the relationship information to the second device while outputting the relationship information to the display.

32. The first device of claim 25, wherein the processor obtains the recommendation information by searching a database stored in the first device.

33. The first device of claim 25, wherein the processor obtains the recommendation information by searching an external database of the first device.

34. The first device of claim 25, further comprising a context aware information collection unit based on the first device, wherein the processor obtains the relationship information of the at least one object by further using information collected by the context aware information collection unit.

35. The first device of claim 34, wherein the processor further uses the context aware information when the recommendation information is obtained.

36. A first device comprising:

a context aware information collection unit for collecting context aware information based on the first device; and a processor for identifying at least one object by using the collecting context aware information collected by the context aware information collection unit, receiving a user input to select an object from among the at least one object included in the image displayed on the first device, obtaining relationship information which represents a relationship between a user of the first device and the at least one object based on identification information of the identified object, obtaining recommendation information about the at least one object based on the relationship information, outputting the relationship information to at least one of a display of the first device and a second device of the at least one object, and outputting the recommendation information to at least one of the display and the second device or transmitting the recommendation information to the second device while outputting the recommendation information to the display.

37. The first device of claim 36, wherein the relationship information further includes relationship information between objects identified when identifying the at least one object by the processor.

38. The first device of claim 36, further comprising a storage unit for storing a database containing information for obtaining the relationship information, wherein the processor obtains the relationship information by searching the database.

39. The first device of claim 36, wherein the processor obtains the relationship information by searching an external database of the first device.

40. The first device of claim 36,
wherein the first device further comprises a network interface unit for transmitting the recommendation information to the second device.

41. The first device of claim 40, wherein the processor further uses the context aware information when obtaining the recommendation information.

42. The first device of claim 36, wherein the processor obtains the recommendation information by searching a database stored in the first device.

43. The first device of claim 36, wherein the processor obtains the recommendation information by searching an external database of the first device.

* * * * *